US010047715B2

(12) United States Patent
Brankin

(10) Patent No.: US 10,047,715 B2
(45) Date of Patent: Aug. 14, 2018

(54) PULL ASSISTANCE APPARATUS

(71) Applicant: Frank Brankin, Glenavy (GB)

(72) Inventor: Frank Brankin, Glenavy (GB)

( * ) Notice: Subject to any disclaimer, the term of this patent is extended or adjusted under 35 U.S.C. 154(b) by 2 days.

(21) Appl. No.: 14/432,917

(22) PCT Filed: Oct. 1, 2013

(86) PCT No.: PCT/EP2013/002939
§ 371 (c)(1),
(2) Date: Apr. 1, 2015

(87) PCT Pub. No.: WO2014/053233
PCT Pub. Date: Apr. 10, 2014

(65) Prior Publication Data
US 2015/0252769 A1    Sep. 10, 2015

Related U.S. Application Data

(60) Provisional application No. 61/708,948, filed on Oct. 2, 2012.

(30) Foreign Application Priority Data

Oct. 1, 2012 (GB) .................................. 1217545.1

(51) Int. Cl.
*F16H 21/10* (2006.01)
*F02N 3/02* (2006.01)
*A01D 34/68* (2006.01)
*F02N 5/02* (2006.01)

(52) U.S. Cl.
CPC ........... *F02N 3/02* (2013.01); *A01D 34/6818* (2013.01); *F02N 5/02* (2013.01); *Y10T 74/13* (2015.01)

(58) Field of Classification Search
CPC .......... F02N 3/02; F02N 5/02; A01D 34/6818
See application file for complete search history.

(56) References Cited

U.S. PATENT DOCUMENTS

| 1,915,377 | A | * | 6/1933 | Morse | F02N 15/06 474/163 |
| 2,210,156 | A | * | 8/1940 | Ufen | A01D 87/08 414/647 |
| 2,310,084 | A | * | 2/1943 | Hooker | F41G 3/2655 310/23 |
| 3,063,437 | A | * | 11/1962 | Wehner | A01D 34/6818 123/185.15 |

(Continued)

FOREIGN PATENT DOCUMENTS

GB    2398352    8/2004

OTHER PUBLICATIONS

International Search Report.
Written Opinion of the International Searching Authority.

*Primary Examiner* — Zakaria Elahmadi
(74) *Attorney, Agent, or Firm* — Preston Smirman; Smirman IP Law, PLLC

(57) ABSTRACT

A pull assist mechanism comprising a reciprocating cord carriage member capable of receiving a pull cord of a fuel powered device. The pull cord being attachable to a power source of the powered device, and the reciprocating cord carriage member being movably mountable on a guide via a carriage movement member. The reciprocating cord carriage member being capable of travel on or along the guide means.

29 Claims, 12 Drawing Sheets

(56) References Cited

U.S. PATENT DOCUMENTS

| | | | | |
|---|---|---|---|---|
| 3,412,483 A * | 11/1968 | Jacobs | ............... | G09B 5/062 |
| | | | | 360/101 |
| 3,555,792 A * | 1/1971 | Tietjen et al. | ......... | A01D 34/63 |
| | | | | 56/13.5 |
| 3,626,635 A * | 12/1971 | Birdsall | ............... | A63H 18/10 |
| | | | | 446/136 |
| 3,718,129 A * | 2/1973 | McKee | ............... | F02N 3/02 |
| | | | | 123/179.24 |
| 3,820,176 A * | 6/1974 | Feiertag | ............... | A61G 7/1019 |
| | | | | 108/1 |
| 4,936,369 A * | 6/1990 | Darner | ............... | E06B 9/361 |
| | | | | 160/168.1 R |
| 5,029,561 A * | 7/1991 | Koga | ............... | B27B 17/00 |
| | | | | 123/185.3 |
| 5,032,067 A * | 7/1991 | Progl | ............... | F16N 13/04 |
| | | | | 184/33 |
| 5,630,388 A * | 5/1997 | Eaton | ............... | F02N 3/04 |
| | | | | 123/185.4 |
| 6,321,709 B1 * | 11/2001 | Lyon | ............... | A01D 34/6818 |
| | | | | 123/185.4 |
| 7,322,334 B1 * | 1/2008 | O'Brien | ............... | B27B 17/00 |
| | | | | 123/185.4 |
| 2001/0037785 A1 * | 11/2001 | Gracyalny | ............... | F02N 5/02 |
| | | | | 123/185.14 |
| 2008/0078350 A1 * | 4/2008 | Wang | ............... | F02N 3/02 |
| | | | | 123/185.4 |
| 2009/0071752 A1 * | 3/2009 | Raasch | ............... | F01M 11/04 |
| | | | | 184/1.5 |
| 2011/0053731 A1 * | 3/2011 | Greenwood | ............... | B62D 11/006 |
| | | | | 476/47 |

* cited by examiner

Section A-A

PULL ASSISTANCE APPARATUS

CROSS-REFERENCE TO RELATED APPLICATION

The instant application is a national phase of U.S. National Phase of PCT/EP2013/002939 filed Oct. 1, 2013, and claims priority to GB Patent Application Serial No. 1217545.1, filed on Oct. 1, 2012, and U.S. Provisional Patent Application Ser. No. 61/708,948, filed on Oct. 2, 2012, the entire specifications of all of which are expressly incorporated herein by reference.

The present invention relates to a pull assist mechanism and in particular to a mechanism for the starting of pull cord type mechanical devices.

Many lawnmowers and other pieces of agricultural/landscaping machinery utilize a pull cord type starting mechanism to initiate their power source. These pull cord starting mechanisms simplify the starting mechanics of the engine, but create a manual burden for the user of the device. While most able bodied users can manage to start pull cord devices, it often takes a few attempts to successfully complete the task. This difficulty is further amplified if an elderly or less able individual is the user. It is not only the pulling action that is the issue as the implement to be started also has to be stabilized as the cord is pulled.

In addition, correct usage of a pull cord device requires pulling of the cord in a straight line in order to effectively apply the required force to start the attached device. Many devices which employ a pull cord starting device have no means for keeping the cord in a straight line and those that do typically employ a simple eyelet/hook attached to a frame or handle through which the cord is fed, thus keeping the cord straight at least in the portion from the power source to the eyelet/hook. This method can improve the angle of pull but as the user will often pull the cord at a non-ideal angle above the eyelet/hook, the cord will rub against the eyelet/hook as it is pulled which decreases the amount of the pulling force that actually transfers to the device.

The prior art discloses a variety of devices which attempt to address the above issue. Devices exist which wind the pull cord around a spool/reel or a series of pulleys. While these devices can remove the pulling load from a user, the winding action can often result in tangling or breakage of the cord. Other devices utilize a similar winding mechanism which is attachable to a hand drill or other rotary tool. Again, these devices suffer from the vulnerability to tangles and breakages of the cord, but also pose difficulties for the elderly or less able as the use of a hand drill, or even the availability of one, may not be appropriate for this group. Another proposed solution involves a step type starter where the cord is attached to a mechanism having a step on activation means. This type of device shifts the burden from the upper body to the lower body of the user, but for the elderly or less able, this may not be any advantage. The final group of devices employs a different approach wherein the starter mechanism acts upon the blades of a lawnmower, providing a rotational starting force to the power source through rotation of the blades. While this may work in theory, it is not suitable for devices which do not have rotating blades and even for those that do, in a practical sense it may not be deemed safe to have mechanisms that interact with the high speed rotating blades.

It is an object of the present invention to obviate or mitigate the problem of applying a sufficient force at an appropriate angle to a pull cord type starting mechanism with the need of only minimal effort on the part of the user.

Accordingly, the present invention provides a pull assist mechanism comprising a reciprocating cord carriage means capable of receiving a pull cord of a fuel powered device, the pull cord being attachable to a power source of the powered device, and the reciprocating cord carriage means being movably mountable on a guide means via a carriage movement means, the reciprocating cord carriage means being capable of travel on or along the guide means.

Advantageously, the cord is pulled by the reciprocating cord carriage means in a direction first away from a power source of the powered device, then returned back to its original position, starting the power source during this motion.

Preferably, the power source is a motor.

Ideally, the guide means is a threaded guide means.

Preferably the threaded guide means is a screw.

Ideally, the screw is a self-reversing screw.

Preferably, the carriage movement means has means for movable engagement with the thread of the self-reversing screw.

Ideally, the geometry of the thread of the self-reversing screw allows slidable movement of the carriage movement means along the self-reversing screw in both directions.

Preferably, the geometry of the thread is configured to allow continuous movement of the carriage movement means between each end of the self-reversing screw as the self-reversing screw rotates axially in one direction only.

Advantageously, the carriage movement means is capable of reciprocating between the longitudinal ends of the self reversing screw without reversing the rotational direction of the screw.

Alternatively, the carriage movement means is endless.

Preferably, the reciprocating cord carriage means is capable of reciprocating between the longitudinal ends of the endless carriage movement means.

Ideally, the reciprocating cord carriage means is capable of reciprocating between the longitudinal ends of the endless cord carriage means in a straight line.

Ideally, the carriage movement means is in operable engagement with a drive means of the pull assist mechanism.

In an alternative arrangement, the carriage movement means is in operable engagement with a drive means of a separable power tool such as a drill or chain saw.

Preferably, the carriage movement means is movably mountable around at least part of the circumference of the endless guide means.

Ideally, the carriage movement means is in slidable engagement with the circumference of the endless guide means.

Preferably, the carriage movement means is an endless belt.

Preferably, the drive means is locatable at or about one lateral edge of the endless guide means.

Advantageously, when the carriage movement means is connected to both the endless guide means and drive means, the carriage movement means length and the dimensions/layout of the endless guide means and drive means, prevent disengagement of the carriage movement means from the endless guide means but allow slidable movement between the carriage movement means and the endless guide means.

Ideally, the carriage movement means has drive engagement means locatable along at least part of its length.

Advantageously, the drive engagement means engage with the drive means and transfer the rotational motion of the drive means into rotational motion of the carriage movement means about the endless guide means.

Ideally, the carriage movement means is a chain.

Preferably, the reciprocating cord carriage means is fixably attachable to at least a portion of the carriage movement means.

Ideally, the reciprocating cord carriage means protrudes from its fixing to the carriage movement means towards the center of the endless guide means.

Ideally, the reciprocating cord carriage means has a bearing receiving means locatable at or about its end distal the end fixable to the carriage movement means.

Preferably the bearing receiving means receives a bearing.

Ideally, the carriage bearing is in contact with a lateral surface of the endless guide means.

Preferably, the bearing is rotatable within the bearing receiving means.

Ideally, the center of the bearing is alignable with the endless guide means centerline which is equidistant between the two lateral edges of the endless guide means.

Ideally, the center of the bearing traverses the endless guide means in a longitudinal direction with minimal or no deviation in the direction of the lateral plane of the endless guide means.

Preferably, the reciprocating cord carriage means has a pull cord receiving means.

Ideally, the pull cord receiving means is fixably attachable to the reciprocating cord carriage means.

Preferably, the pull cord receiving means is locatable on the bearing receiving means.

Ideally, the pull cord receiving means is locatable at or about the center of the bearing.

Advantageously, as the pull cord receiving means is alignable with the center of the endless guide means, its motion occurs in a significantly straight line fashion along the endless guide means, in turn pulling the cord in a straight line as it moves.

Preferably, the endless guide means is an elongate member having at least an outer perimeter contactable by the carriage movement means.

Preferably, the endless guide means is a channel section.

Ideally, the channel section is generally U-shaped in cross section.

Preferably, the generally U-shaped section comprises a base member and two side sections extending from the base member.

Ideally, the side sections are joinable to form an endless channel section.

Ideally, at least one side section has a lip formable at its end distal the end closest the base section.

Preferably, the reciprocating cord carriage means has a means for movable engagement with the channel section.

Ideally, the reciprocating cord carriage means has a means for movable engagement with the lip of the channel section.

Ideally, the reciprocating cord carriage means is attachable to the carriage movement means.

Preferably, the carriage movement means is locatable along the outer perimeter of the side walls of the channel section.

Advantageously, as the carriage movement means moves around the perimeter of the side walls of the channel section, the carriage movement means forces movement of the reciprocating cord carriage means around the channel section.

Preferably, the perimeter of the flat planar elongate body and the carriage movement means have cooperating engagement means for retaining the carriage movement means on the perimeter of the flat planar elongate body as the carriage movement means moves along the perimeter.

Ideally, the flat planar elongate body is a blade.

Preferably, the drive means has a control means in operable engagement therewith.

Ideally, the control means can activate to full speed, de-activate, vary the speed therebetween, and/or reverse the direction of the drive means.

Preferably, the control means is an electronic control means.

Preferably, the control means has memory means.

Ideally, the control means has a processor.

Preferably, the control means has a software control program executable thereon.

Ideally, the electronic control means is operably engaged with position sensing means for providing signals in relation to the position of the reciprocating cord carriage means.

Ideally, the software control program on the electronic control means has means for discerning the position of the reciprocating cord carriage means on the guide means from the signals provided by the position sensing means.

Preferably, the means for discerning the position of the carriage movement means on the guide means are one or more sensors locatable on the carriage and/or endless guide means.

Ideally, the drive means has an activation means in operable engagement between the power and the motor.

Preferably, the activation means is a trigger or switch or an input means such as a control panel.

Ideally, the memory means of the control means can store a range of software control modules containing instructions for the desired movement of the carriage movement means about the endless guide means to be permitted once initiated by the activation means.

Advantageously, this allows an operator to cause the pull cord to be pulled once, twice, or more times depending on the type or age of the fuel powered device that the pull assist mechanism is attached to.

Preferably, upon instruction from the activation means, the software control program is executed and loads a module which runs to inform the drive means to initiate movement of the reciprocating cord carriage means along the guide means in a longitudinal direction and back to its initial position as the carriage movement means moves along the guide means.

Ideally, the one or more sensors inform the control means that the desired motion has been completed and that the drive means should be deactivated.

Advantageously, upon user interaction with the activation means, the drive means initiates movement of the reciprocating cord carriage means from its resting position closest the target device, to an end of the guide means distal the target device and back to its initial position, pulling the cord from the target device to start it and returning it as it goes.

Ideally, the control means has a second software program executable thereon for controlling the movement of the carriage movement means dependent on the cord tension.

Preferably, the control means is in operable engagement with a cord tension sensing means.

Ideally, the cord tension sensing means is a resistance sensor locatable on the reciprocating cord carriage means.

Preferably, the cord tension sensing means is locatable on the bearing.

Ideally, the memory means has information thereon relating to levels of cord tension which indicate the target device has started.

Preferably, if the cord tension drops below a certain level which suggests the target device has started, the control means stops the drive means preventing further movement of the reciprocating cord carriage means.

Ideally, the drive means of the pull assist mechanism has a slip clutch.

Alternatively, if the cord tension drops below a certain level which suggests the target device has started, the movement of the reciprocating cord carriage means is stopped by the slip clutch.

Preferably, if the cord tension is above a certain level, the movement of the reciprocating cord carriage means is stopped by the slip clutch.

Advantageously, if components of the powered device are preventing pulling of the cord, for example if a piston is at a certain stage in its stroke at the beginning of the pulling operation which causes undue pressure and inhibits pulling, the slip clutch will stop the pulling operation to prevent cord breakage.

Ideally, after the carriage movement means has been stopped due to the cord tension level, the control means reverses the direction of the drive means and returns the reciprocating cord carriage means to its original position.

Advantageously, if the cord tension drops indicating that the target device has started, the cord is not pulled from the target device any further preventing damage to the target device. The cord is returned to its original position by reversing the direction of the drive means rather than forcing the reciprocating cord carriage means to return via movement of the carriage movement means along the remainder of the guide means in its original direction of motion.

Ideally, the guide means, carriage movement means and reciprocating cord carriage means are housed within a casing.

Preferably, the drive means and activation means are locatable at one end of the casing.

Ideally, the casing is restable on a part of the target device proximal the retracted pull cord during activation.

Preferably, the drive means and activation means are locatable at the end of the casing distal the end restable on the target device.

Ideally, the casing/housing has a stabilizing means attachable thereto.

Preferably, the stabilizing means can be rested on the ground or other stable surface to provide stabilization during use.

Ideally, the stabilizing means is a tripod.

Preferably, the casing also has a stabilizing handle.

Advantageously, the stabilizing handle allows the user to gain additional purchase on the pull assist mechanism.

Advantageously, as the pull cord is inserted into the pull cord receiving means and the pull assist mechanism is rested on the target device, the pull assist mechanism is portable from one target device to another.

Preferably, where a target device has a cord pull length of less than a specified amount, an adaptor is attachable to the pull assist mechanism.

Advantageously, the adaptor ensures no excessive pull out of the cord occurs.

Ideally, the adaptor is a recoil mechanism.

Preferably, the recoil mechanism comprises a rotatable spool means.

Ideally, the rotatable spool means can be locked to prevent rotation.

Preferably, the rotatable spool is locatable on the reciprocating cord carriage means.

Advantageously, if the device is known to require a specified pull length, the recoil mechanism is unlocked to rotate and uncoil a section of cord beyond this length, the uncoiling action allowing further movement of the reciprocating cord carriage means without resulting in additional cord being pulled from the device.

Alternatively, where different devices require different cord pull lengths, guide means of different lengths are used.

Preferably, the pull assist apparatus can be supplied as a kit having guide means of various lengths.

Advantageously, the kit can be designed to provide guide means capable of starting the most common devices.

In an alternative embodiment, the pull assist mechanism is attachable to the body of the target device.

Ideally, the pull assist mechanism is attachable to the handle of the target device.

Advantageously, where the user does not require that the pull assist mechanism be used to start multiple pull cord devices, the pull assist mechanism can be attached to the single device in question making use more convenient and improving stability during use.

Ideally, the pull assist mechanism is integrally designed together with the fuel powered device during manufacture of the device.

Preferably, the guide means is a linear guide means.

Ideally, the reciprocating cord carriage means is movable along the guide means in both directions.

Preferably, the reciprocating cord carriage means is in operable engagement with a biasing means.

Ideally, as the reciprocating cord carriage means moves along the guide means it charges the biasing means.

Advantageously, upon reaching the position wherein the cord is ready to be pulled, the energy stored in the biasing means is released, thereby assisting the drive during the pulling of the cord.

Ideally, the biasing means is a spring.

Preferably, the biasing means is a helical spring, a compression spring, or a torsion spring.

Advantageously, the reciprocating cord carriage means moves in one direction along the guide means, charging the spring as it moves. The energy stored in the spring can then be released, returning the reciprocating cord carriage means back to its original position. The spring arrangement results in less demand on the drive means and facilitate the use of lower powered battery drives.

Preferably, the pull assist apparatus has a shock absorbing means for absorbing the force of the pull.

Advantageously, where the drive means creates a large pulling force, a portion of this force is absorbed by the shock absorbing means to protect the cord from breakage.

In another embodiment of pull assist mechanism, the carriage movement means is provided by a chain.

Ideally, the chain is mounted on a spaced apart driving sprocket and a driven sprocket mounted on a housing.

Preferably, the chain driving and driven sprockets are mounted on driving and driven axles located on opposing ends of a tubular housing formed for completely enclosing the chain and sprockets.

Ideally, the tubular housing is quadrangular in cross section.

Preferably, the carriage movement member comprises an adapter coupled to the chain for supporting the reciprocating cord carriage means.

Ideally, a guide arrangement is provided for guiding the movement of part of the reciprocating cord carriage means along the length of the tubular housing.

Preferably, two guide members protrude from two opposing side walls of the tubular housing defining two passageways.

Ideally, the reciprocating cord carriage means has a plate, ideally quadrangular in cross section with an engagement member protruding from one main planar surface of the plate for engagement with an engagement member of the carriage movement means or vice versa.

Preferably, two mutually opposing lateral edges of the plate have guide means formed for engagement with the two passageways. As the reciprocating cord carriage means reciprocates between the ends of the tubular housing under the influence of the carriage movement means, the guide means slide along the passageways improving the overall stability of the pull assist mechanism.

Ideally, the plate has as second engagement member protruding from the other main planar surface of the plate formed for engagement with a pull cord receiving member or vice versa namely an engagement member extends from the pull cord receiving member for engagement with the plate.

Preferably, the pull cord receiving member is fixably attached to the second engagement member of the plate of the reciprocating cord carriage means.

Ideally, the pull cord receiving member is located outside of the tubular housing and for this purpose a wall of the tubular housing proximal to the second engagement member has a longitudinal slot extending along the wall for allowing the second engagement member to extend out through the quadrangular tubular housing and engage the pull cord receiving member.

Preferably, the pull cord receiving member is provided by a c-shaped open tubular body for engaging the handle or similar mechanism of a pull cord.

Ideally, the pull cord receiving member is located at or about the center of the chain. Advantageously, as the pull cord receiving member is alignable with the center of the chain, its motion occurs in a significantly straight line fashion along the chain, in turn pulling the cord in a straight line as it moves.

Preferably, the driving sprocket at one end of the of the pull assist mechanism has a gear box, outside the tubular housing and this gear box is attachable to a drive means of the pull assist mechanism.

Alternatively, the gear box is attachable to a motor or drive means of a separate power tool such as a drill or chain saw.

At the other end of the pull assist mechanism there is a bracket having an axle for locating the driven sprocket located outside the quadrangular tubular housing.

Ideally, the bracket also supports a pull cord guide member in alignment with pull cord receiving member.

Preferably, a cover extends from the tubular housing enclosing the pull cord receiving member.

Ideally, part of the cover is movably and preferably pivotally coupled to the tubular housing to allow an operator to pull the cover back to allow the handle of the pull cord to be inserted into the pull cord receiving member. When the handle is inserted, the cover can be closed around the pull cord receiving member and the encapsulated handle.

Preferably, the tubular housing has end plates for closing off the ends of the tubular housing. Advantageously, the tubular housing and the cover as well as the end plates improve the safety of the pull assist mechanism protecting the user from moving parts of the mechanism during use.

The invention will now be described with reference to the accompanying drawings which show by way of example embodiments of a pull assistance apparatus in accordance with the invention. In the drawings.

Figure 1:
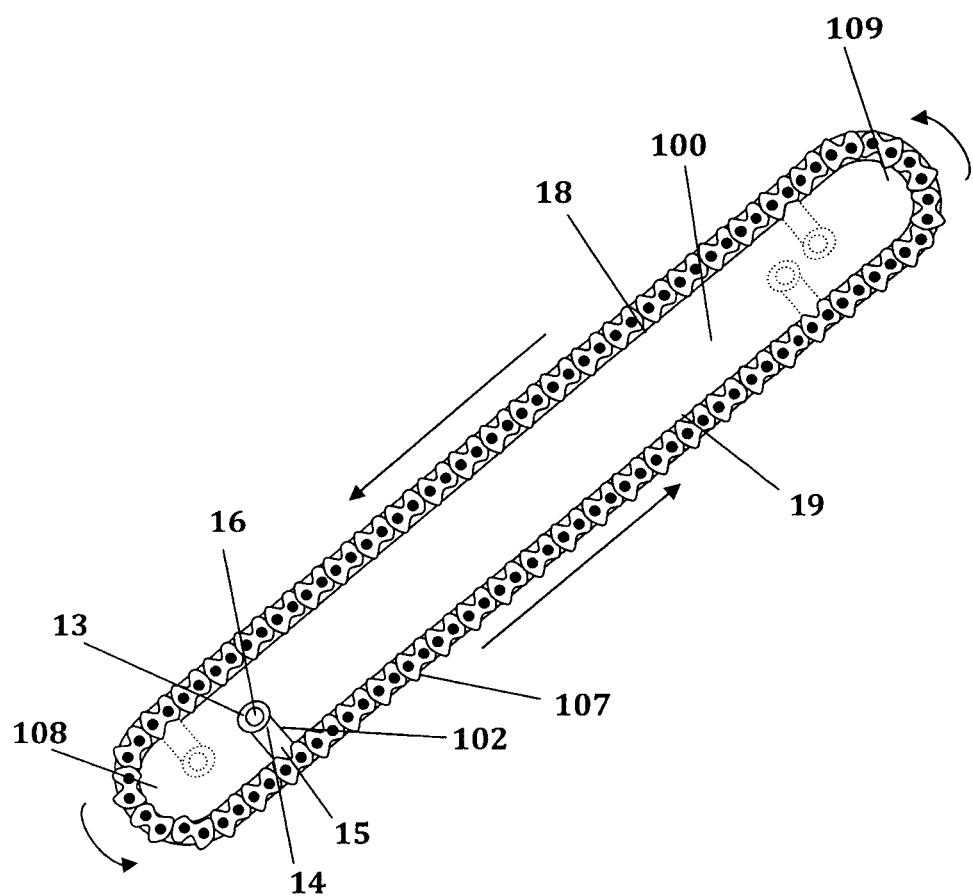
FIG. 1 is a side view of the guide, chain, and reciprocating cord carriage means.
Figure 2:
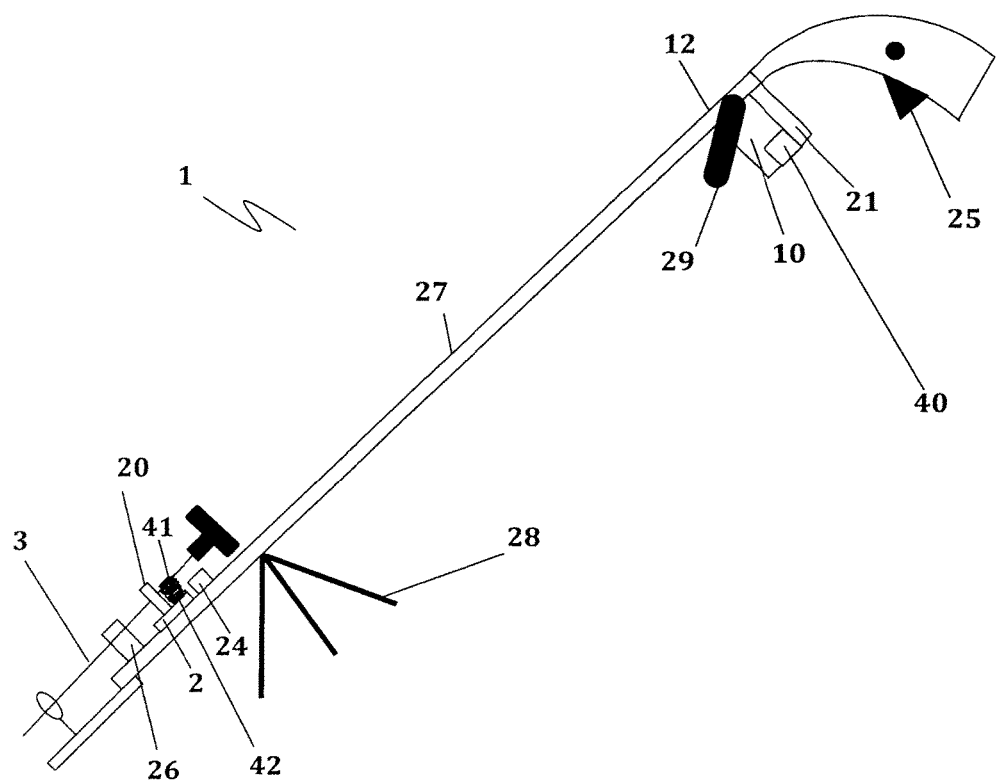
FIG. 2 is a side view of the pull assist apparatus with the pull cord of a device inserted into the pull cord receiving member.
Figure 3:
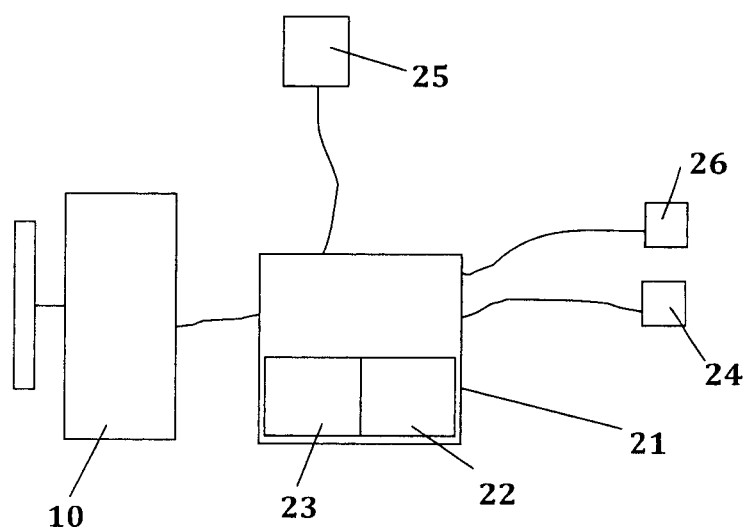
FIG. 3 is a schematic showing the components of the electronic control device including the drive, sensor, and activation members.

In the drawings, there is shown a pull assist apparatus indicated generally by the reference numeral 1 having a reciprocating cord carriage 2 capable of receiving a pull cord 3 of a fuel powered device 4, the pull cord 3 being attached to a power source 5 of the powered device 4. The reciprocating cord carriage 2 is movably mounted on an endless guide 6 via a chain 7, the reciprocating cord carriage 2 being capable of travel along the guide 6.

The cord 3 is pulled by the reciprocating cord carriage 2 in a direction first away from the power source 5, and then returned back to its original position, starting the power source 5 during this motion. The reciprocating cord carriage 2 moves between the longitudinal ends 8, 9 of the endless guide 6 in a straight line.

Figure 5:
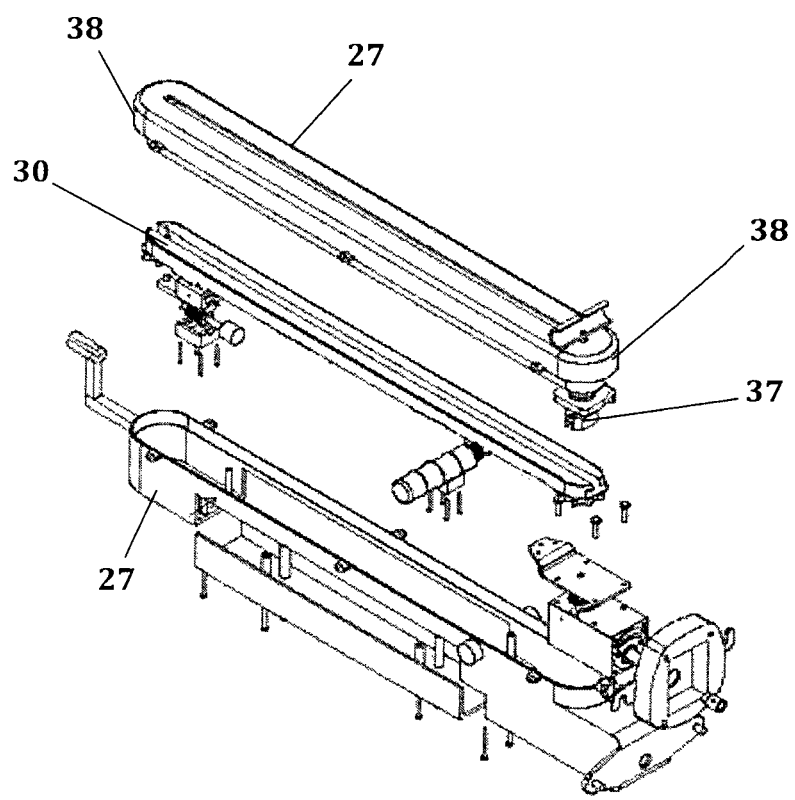
FIG. 5 is an exploded perspective assembly view of the channel section and accompanying components.
Figure 6:
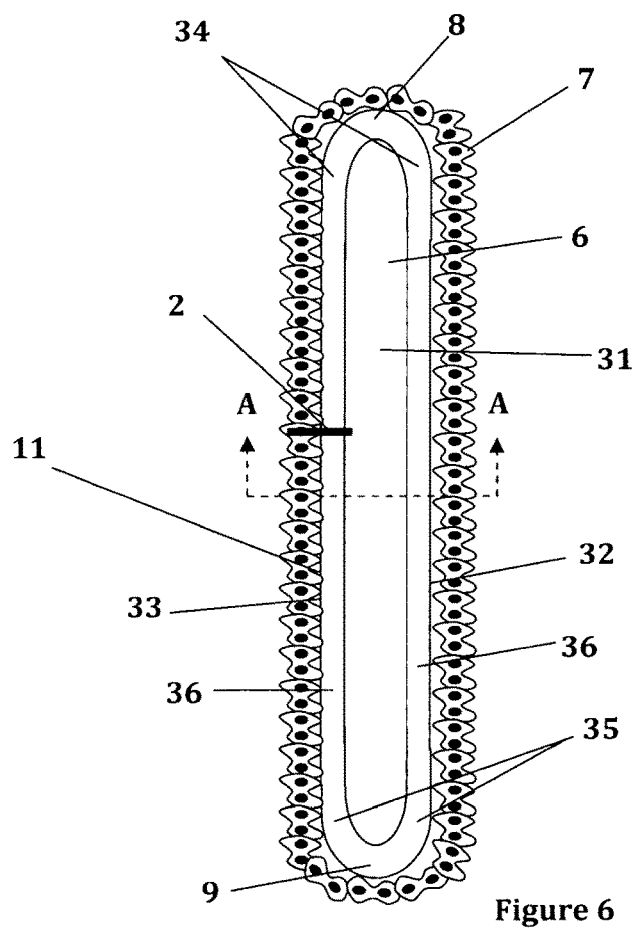
FIG. 6 is a top view of the channel section.
Figure 7:
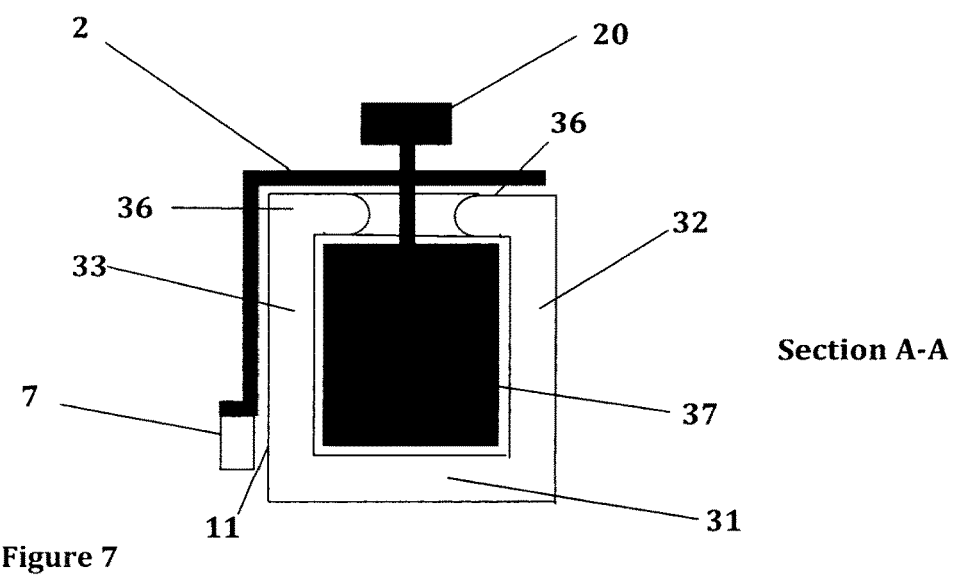
FIG. 7 is a sectional view of section A-A of FIG. 6 showing the detail of the channel section and the location of the reciprocating cord carriage means.

In a first embodiment shown in FIGS. 5-7, the endless guide 6 is a generally U-shaped channel section 30 comprising a base member 31 and two side sections 32, 33 extending from the base member 31. The side sections 32, 33 are joinable about their corresponding ends 34 and similarly about their corresponding ends 35 to form an endless channel section. Alternatively, the ends of the side sections 34, 35 are provided with end caps 38 to form an endless channel section. The side sections 34, 35 have a lip 36 formable at their ends distal the ends closest the base section 31 and the reciprocating cord carriage 2 has a member 37 for movable engagement with the channel section 30. The reciprocating cord carriage 2 is also attachable to the chain 7 which is rotatably mounted along the outer circumference 11 of the side walls 32, 33 of the channel section 30. As the chain 7 moves around the perimeter of the side walls 32, 33 of the channel section 30, the chain 7 forces movement of the reciprocating cord carriage 2 around the channel section 30.

The chain 7 is in operable engagement with a drive 10 of the pull assist mechanism 1 and also in sliding engagement with the circumference 11 of the endless guide 6. The drive 10 is locatable at one lateral edge 12 of the endless guide 6. When the chain 7 is connected to both the endless guide 6 and drive 10, the chain length and the dimensions/layout of the endless guide 6 and drive 10, prevent disengagement of the chain 7 from the endless guide 6 but allow sliding movement between the chain 7 and the endless guide 6.

The reciprocating cord carriage 2 has a pull cord receiving attachment 20 fixably attached. As the pull cord receiving attachment 20 is aligned with the center of the endless guide 6, its motion occurs in a significantly straight line fashion along the endless guide 6, in turn pulling the cord 3 in a straight line as it moves.

The drive 10 has an electronic control module 21 which can activate to full speed, de-activate, vary the speed therebetween, and/or reverse the direction of the drive 10. The control module 21 has a memory module 22, having a software control program executable thereon, and a processor 23. The electronic control module 21 is operably engaged with a position sensor 24 for providing signals in relation to the position of the reciprocating cord carriage 2. The software control program on the electronic control module 21 can discern the position of the reciprocating cord carriage 2 on the endless guide 6 from the signals provided by the position sensor 24. The drive 10 has an activation trigger 25 and the memory module 22 of the electronic control module 21 can store a range of software control modules containing instructions for the desired movement of the chain 7 about the endless guide 6 to be permitted once initiated by the activation trigger 25. This allows an operator to cause the pull cord 3 to be pulled once, twice, or more times depending on the type or age of the fuel powered device 4 that the pull assist mechanism 1 is attached to.

In use, upon instruction from the activation trigger 25, the software control program is executed and loads a module which runs to inform the drive 10 to initiate movement of the reciprocating cord carriage 2 along the endless guide 6 in a longitudinal direction and back to its initial position as the chain 7 moves along the circumference of the endless guide 6. The position sensor 24 informs the electronic control module 21 that the desired motion has been completed and that the drive 10 should be deactivated. Upon user interaction with the activation trigger 25, the drive 10 initiates movement of the reciprocating cord carriage 2 from its resting position closest the target device 4, to an end 9 of the endless guide 6 distal the target device 4 and back to its initial position, pulling the cord 3 from the target device 4 to start it and returning the cord 3 as it goes.

The electronic control module 21 has a second software program executable thereon for controlling the movement of the chain 7 dependent on the cord tension. The electronic control module is in operable engagement with a cord tension sensor 26.

The memory module 22 has information thereon relating to levels of cord tension which indicate the target device 4 has started. If the cord tension drops below a certain level which suggests the target device 4 has started, the electronic control module 21 stops the drive 10 preventing further movement of the chain 7. After the chain 7 has been stopped due to the cord tension level, the electronic control module 21 reverses the direction of the drive 10 and returns the reciprocating cord carriage 2 to its original position meaning that if the cord tension drops indicating that the target device 4 has started, the cord 3 is not pulled from the target device 4 any further preventing damage to the target device 4. The cord 3 is returned to its original position by reversing the direction of the drive 10 rather than forcing the reciprocating cord carriage 2 to return via movement of the chain 7 along the remainder of the circumference of the endless guide 6 in its original direction of motion.

Alternatively, the drive 10 of the pull assist mechanism 1 has a slip clutch 40. If the cord tension drops below a certain level which suggests the target device 4 has started, the movement of the reciprocating cord carriage 2 is stopped by the slip clutch 40. Similarly, if the cord tension is above a certain level, the movement of the reciprocating cord carriage 2 is stopped by the slip clutch 40. If components of the target device 4 are preventing pulling of the cord, for example if a piston is at a certain stage in its stroke at the beginning of the pulling operation which causes undue pressure and inhibits pulling, the slip clutch 40 will stop the pulling operation to prevent cord breakage.

The endless guide 6, chain 7 and reciprocating cord carriage 2 are housed within a casing 27 with the drive 10 and activation trigger 25 locatable at one end of the casing 27. The casing 27 is rested on a part of the target device 4 proximal the retracted pull cord 3 during activation. The casing 27 has stabilizing members 28 attachable thereto which can be rested on the ground or other stable surface to provide stabilization during use. The casing 27 also has a stabilizing handle 29 which allows the user to gain additional purchase on the pull assist mechanism 1.

As the pull cord 3 is inserted into the pull cord receiving attachment 20 and the pull assist mechanism 1 is rested on the target device 4, the pull assist mechanism 1 is portable from one target device 4 to another.

The pull assist apparatus has a recoil mechanism 41 comprising a rotatable spool 42. The rotatable spool 42 can be locked to prevent rotation and is located on the reciprocating cord carriage 2. If the target device 4 is known to require a specified pull length, the recoil mechanism 41 is unlocked to rotate and uncoil a section of cord beyond this length, the uncoiling action allowing further movement of the reciprocating cord carriage 2 without resulting in additional cord 3 being pulled from the target device 4.

Figure 4:
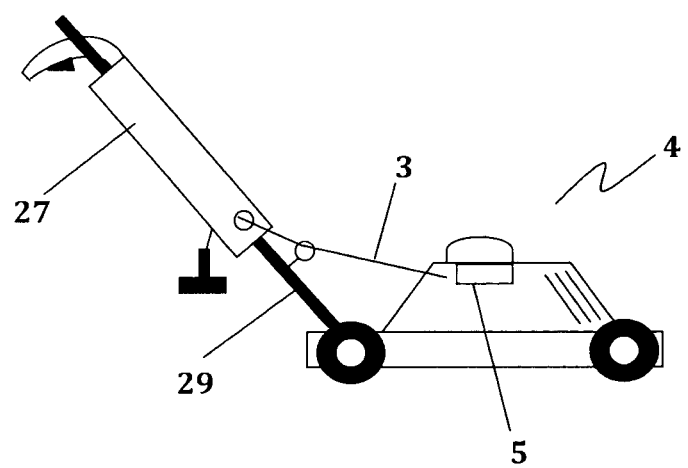
FIG. 4 is a side view of the device mounted on a lawnmower.

In an alternative embodiment as shown in FIG. 4, the pull assist mechanism 1 is attachable to the handle 29 of the target device 4. As a result, where the user does not require that the pull assist mechanism 1 be used to start multiple pull cord devices, the pull assist mechanism 1 can be attached to the single device 4 in question making use more convenient and improving stability during use.

In an alternative embodiment shown in FIG. 1, the endless guide 6 is a blade 100. The reciprocating cord carriage 102 is fixably attached to at least a portion of the chain 107 and protrudes from its fixing to the chain 107 towards the center of a blade 100. The reciprocating cord carriage 102 has a bearing receiving member 13 locatable at or about its end 14 distal the end 15 fixed to the chain 7, which receives a bearing 16. The bearing 16 is in contact with a lateral surface 17 of the blade 100. The bearing 16 is rotatable within the bearing receiving member 13 and the center of the bearing 16 is aligned with center line of the blade 100 centerline which is equidistant between the two lateral edges 18, 19 of the blade 100 so that the center of the bearing 16 traverses the blade 100 in a longitudinal direction with minimal or no deviation in the direction of the lateral plane of the blade 100.

Figure 8:
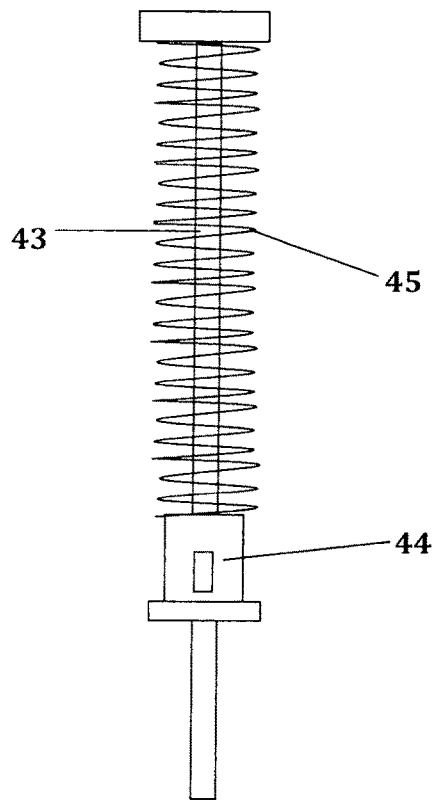
FIG. 8 is a view of one embodiment of the invention having a spring and showing the spring in a non-biased condition.
Figure 9:
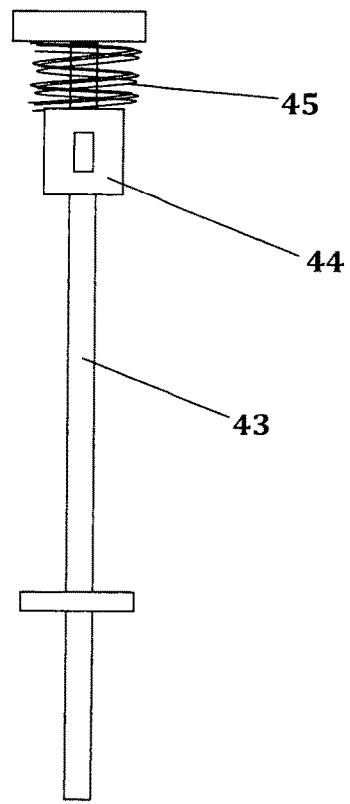
FIG. 9 is a view of one embodiment of the invention having a spring and showing the spring in a biased condition.

In an alternative embodiment shown in FIGS. 8 and 9 the guide 6 is a linear guide 43. The reciprocating cord carriage 44 is movable along the guide 43 in both directions and is in operable engagement with a compression spring 45. As the reciprocating cord carriage 44 moves along the linear guide 43 it charges the compression spring 45 which then provides additional energy to assist the drive 10 in moving the reciprocating cord carriage 44 to its end position. The reciprocating cord carriage 44 moves in one direction along the linear guide 43, charging the compression spring 45 as it moves. Upon reaching a position wherein the cord 3 is fully inserted in the device to be started, energy stored in the spring 45 is released, assisting the drive 10 to move the reciprocating cord carriage 44 while pulling the cord 3. The spring 45 arrangement results in less demand on the drive 10 and facilitates the use of lower powered battery drives.

Figure 10:
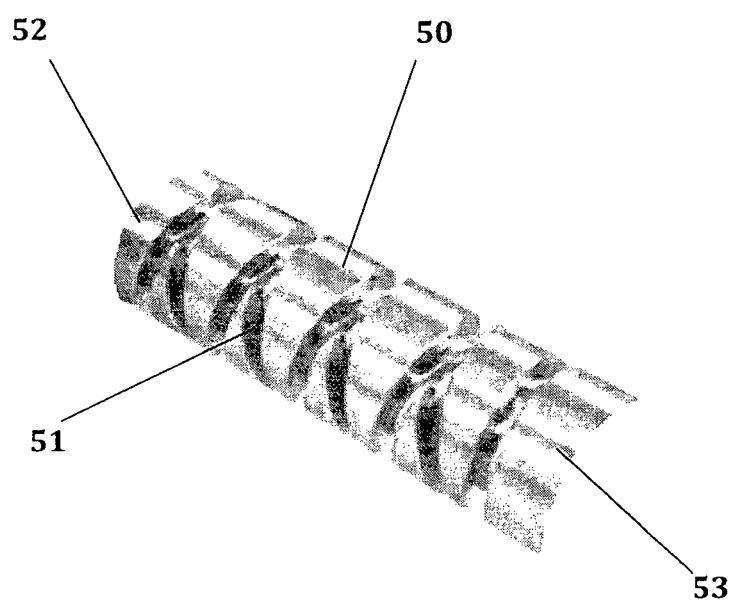
FIG. 10 is a part sectional view of a self reversing screw.
Figure 11:
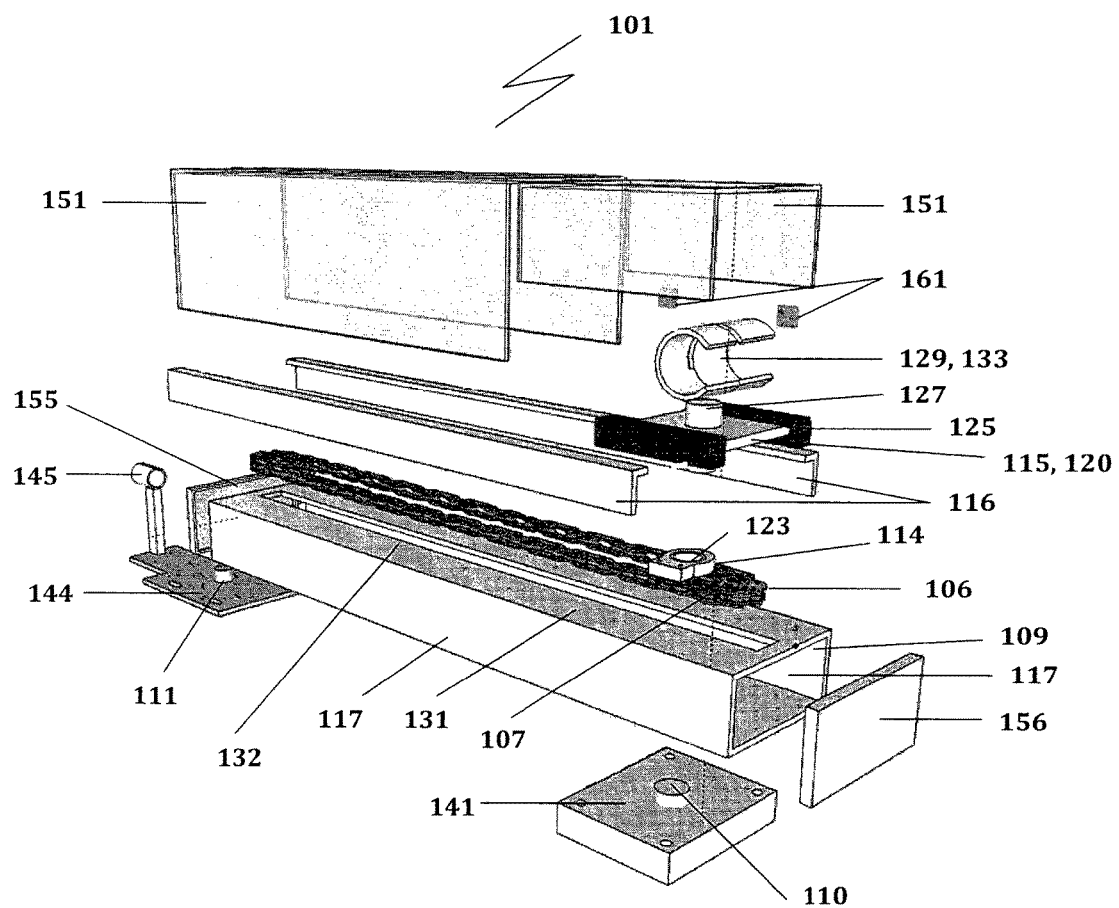
FIG. 11 is an exploded view of a second embodiment of pull assist apparatus.
Figure 12:
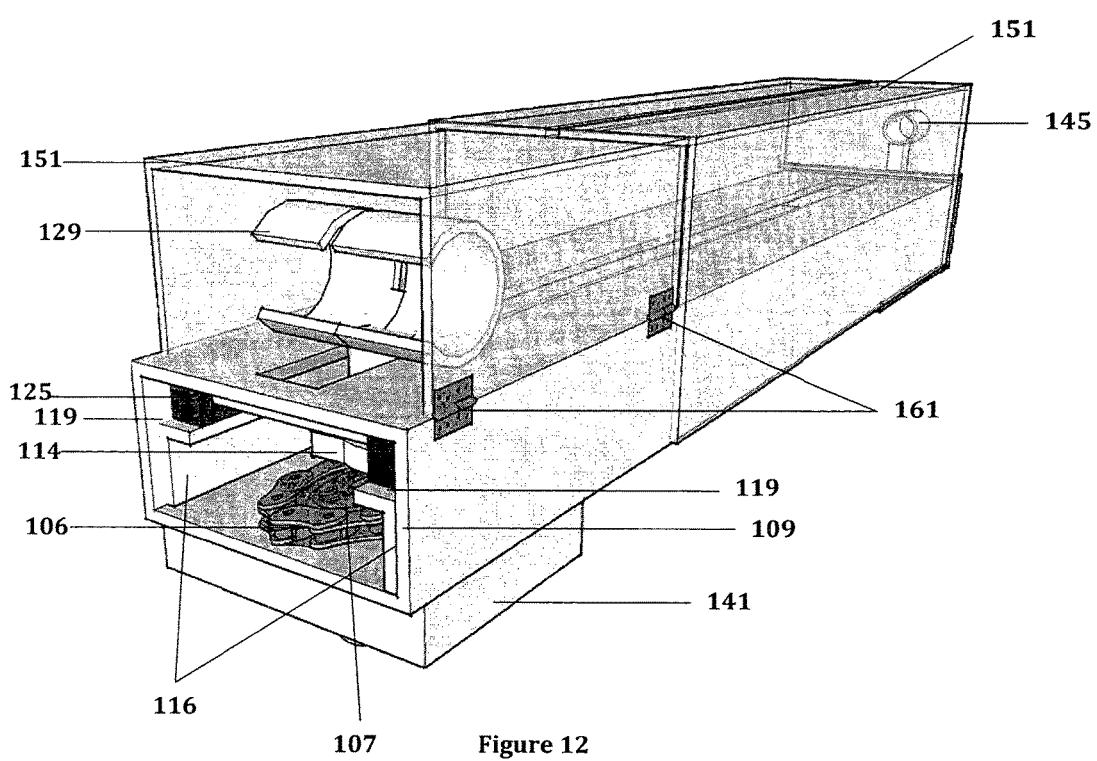
FIG. 12 is a perspective view of the second embodiment of pull assist apparatus.
Figure 13:
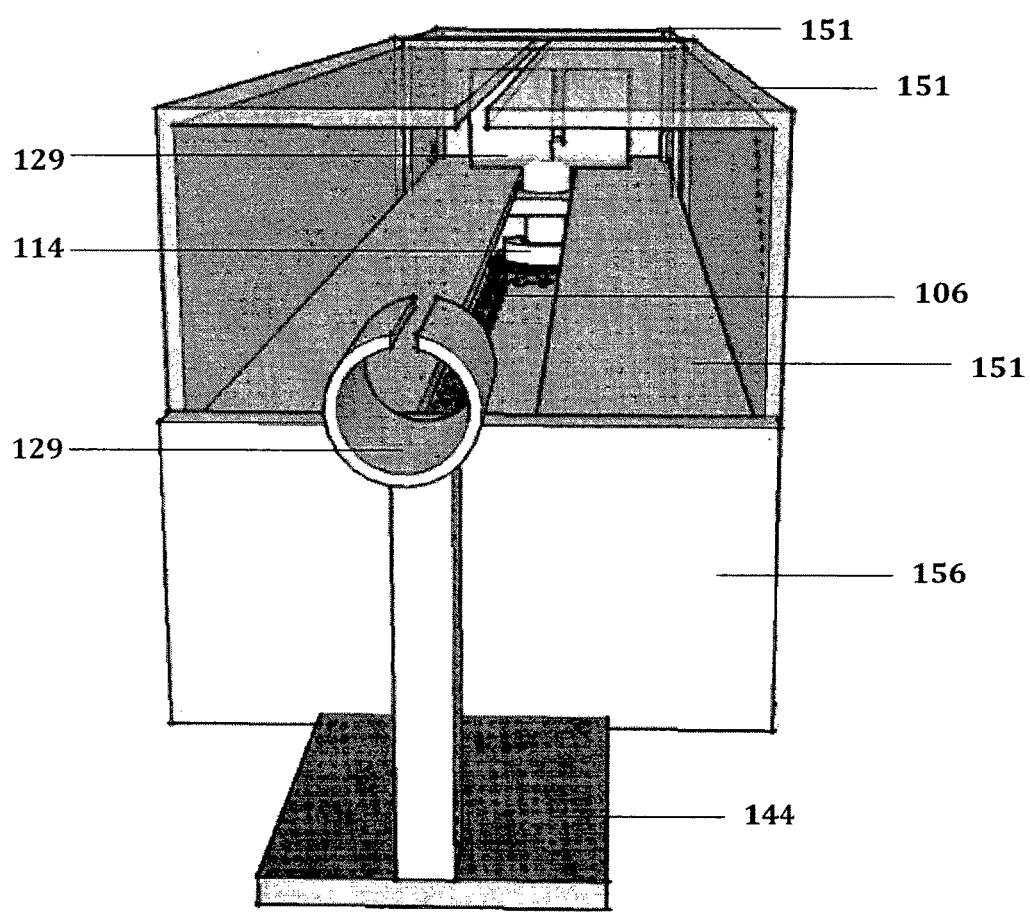
FIG. 13 is a front end view of the second embodiment of pull assist apparatus, end cap removed.

In a further embodiment of the invention, the guide is a self-reversing screw 50 (see FIG. 10). The reciprocating cord carriage 2 is in movable engagement with the thread 51 of the self-reversing screw 50. The geometry of the thread 51 of the self-reversing screw 50 allows sliding movement of the carriage movement member 51 along the self-reversing screw 50 in both directions. The geometry of the thread 51 is configured to allow continuous movement of the carriage movement member 51 between each end 52, 53 of the self-reversing screw 50 as the self-reversing screw 50 rotates axially in one direction only. As a result, the carriage movement member 51 is capable of reciprocating between the longitudinal ends 53, 53 of the self reversing screw 50 without reversing the rotational direction of the self-reversing screw 50.

Figure 14:
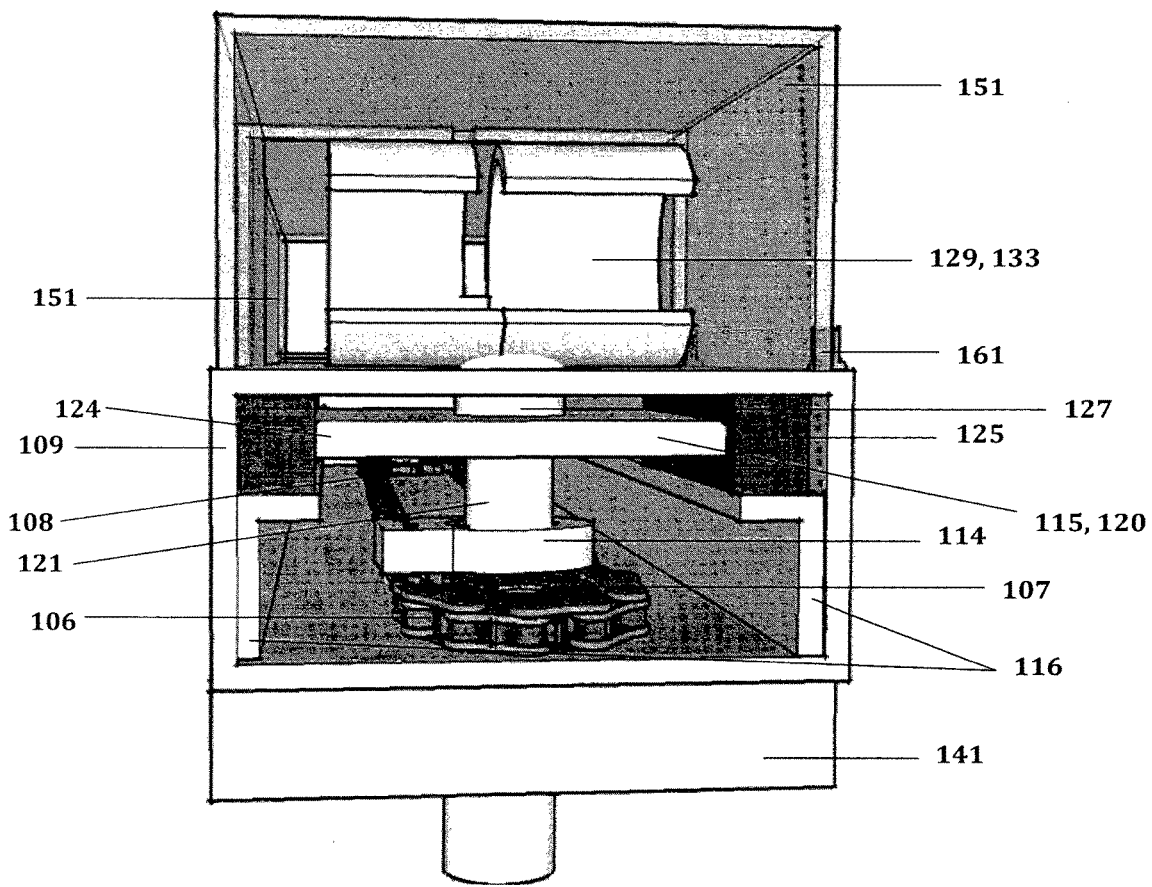
FIG. 14 is a rear end view of the second embodiment of pull assist apparatus, end cap removed.

In a second embodiment of pull assist mechanism indicated generally by reference numeral 101 shown in FIGS. 11 to 14, the carriage movement member 106 is provided by a chain 106 separated by a driving sprocket 107 and a driven sprocket 108, see FIG. 14. The chain driving and driven sprockets 107, 108 are mounted on axles 110, 111 respectively on either end of a quadrangular tubular housing 109 formed for completely enclosing the chain 106 and sprockets 107, 108. The carriage movement member 106 has an adapter 114 coupled to the chain 106 for supporting the reciprocating cord carriage member 120. A guide arrangement is provided for guiding the movement of part of the reciprocating cord carriage member 115, 125 along the length of the quadrangular tubular housing 109. Two guide members 116 protrude from two opposing side walls 117 of the quadrangular tubular housing 109 defining two passageways 119. The reciprocating cord carriage member 115 has a body 120 being a quadrangular plate 120 with an engagement member 121 protruding from one main planar surface of the plate 120 for engagement with an engagement member 123 of the adapter 114.

Two mutually opposing lateral edges 124 of the plate 120 have guide blocks 125 formed for engagement with the two passageways 119. As the carriage movement member 106 reciprocates between the ends of the quadrangular tubular housing 109 under the power of the chain 106, the guide blocks 125 slide along the passageways 119 improving the overall stability of the pull assist mechanism 101. The quadrangular plate 120 has as second engagement member 127 protruding from the other main planar surface 128 of the plate 120 formed for engagement with a pull cord receiving member 129. The pull cord receiving member 129 is fixably attached to the second engagement member 127 of the plate 120 of the reciprocating cord carriage member 115.

The pull cord receiving member 129 is located outside of the quadrangular tubular housing 109 and for this purpose the wall 131 of the quadrangular tubular housing 109 proximal to the second engagement member 127 has a longitudinal slot 132 extending along the wall 131 for allowing the second engagement member 127 to extend out through the quadrangular tubular housing 109 and engage the pull cord receiving member 129. The pull cord receiving member 129 is provided by a c-shaped open tubular body 133 for engaging the handle of a pull cord. The pull cord receiving member 129 is located at or about the center of the chain 106.

Advantageously, as the pull cord receiving member 129 is alignable with the center of the chain 106, its motion occurs in a significantly straight line fashion along the chain 106, in turn pulling the cord in a straight line as it moves.

The driving sprocket 107 at one end of the of the pull assist mechanism 101 has a gear box 141, outside the quadrangular tubular housing 109 and this gear box 141 can be attached to a motor of the pull assist mechanism 101 or alternatively it can be attached to a motor or drive arrangement of a separate power tool such as a drill or chain saw.

At the other end of the pull assist mechanism 101 there is a bracket 144 having an axle 111 for locating the driven sprocket 108, again outside the quadrangular tubular housing 109. The bracket 144 also supports pull cord guide member 145 in alignment with pull cord receiving member 129 to ensure all pulling force is applied to the motor of the target device.

A cover 151 extends from the quadrangular tubular housing 109 for enclosing the pull cord receiving member 129 along its entire length of travel. Part of the cover 151 proximal to one end of the tubular housing 109 is movably and preferably pivotally coupled to the quadrangular tubular housing 109 via hinges to allow an operator to pull the cover back to allow the handle of the pull cord to be inserted into the pull cord receiving member 129. When the handle is inserted, the cover 151 can be closed around the pull cord receiving member 129 and the encapsulated handle. The quadrangular tubular housing 109 has end plates 155, 156 for closing off the ends of the quadrangular tubular housing 109. The quadrangular tubular housing 109 and the cover 151 as well as the end plates 155, 156 improve the safety of the pull assist mechanism 101 by protecting the user from moving parts during use.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:

1. A pull assist mechanism, comprising:
a reciprocating cord carriage means capable of receiving a pull cord of a fuel powered device, wherein the pull cord is attachable to a power source of the device, wherein the reciprocating cord carriage means is movably mountable on a guide means via a carriage movement means, wherein the reciprocating cord carriage means is capable of travel on or along the guide means, wherein the carriage movement means comprises a spaced apart driving member and a driven member engaging and driving a closed loop drive means, wherein the guide means comprises a housing supporting the carriage movement means, wherein the guide means comprises a guide arrangement for guiding movement of part of the reciprocating cord carriage means along a length of the housing, wherein guide members protrude from opposing side walls of the housing defining a passageways, wherein the reciprocating cord carriage means comprises a body formed for slidable movement along the guide means wherein the body and the carriage movement means are operably coupled by engagement means, and wherein the reciprocating cord carriage means comprises a pull cord receiving member wherein the body and the pull cord receiving member are operably coupled by engagement means.

2. The pull assist mechanism as claimed in claim 1, wherein the carriage movement means is endless.

3. The pull assist mechanism as claimed in claim 2, wherein the reciprocating cord carriage means is capable of reciprocating between longitudinal ends of the endless carriage movement means.

4. The pull assist mechanism as claimed in claim 3, wherein the reciprocating cord carriage means is capable of reciprocating between the longitudinal ends of the endless carriage movement means in a straight line.

5. The pull assist mechanism as claimed in claim 1, wherein the carriage movement means is in operable engagement with a drive means of the pull assist mechanism.

6. The pull assist mechanism as claimed in claim 1, wherein the carriage movement means is in operable engagement with an auxillary drive means.

7. The pull assist mechanism as claimed in claim 1, wherein the housing is a tubular housing.

8. The pull assist mechanism as claimed in claim 1, wherein the driving member and the driven member are mounted on driving and driven axles respectively located at or about opposing ends of the housing.

9. The pull assist mechanism as claimed in claim 1, wherein the carriage movement means comprises an adapter coupled to the closed loop drive means for engaging and driving the reciprocating cord carriage means.

10. The pull assist mechanism as claimed in claim 1, wherein two mutually opposing lateral edges of the body have guide members formed for engagement with the two passageways.

11. The pull assist mechanism as claimed in claim 1, wherein the pull cord receiving member is located outside of the housing wherein a wall of the housing proximal to the pull cord receiving member has a longitudinal slot extending along the wall for allowing engagement between the pull cord receiving member and the body.

12. The pull assist mechanism as claimed in claim 1, wherein the pull cord receiving member is provided by a c-shaped open tubular body for engaging a handle of the pull cord.

13. The pull assist mechanism as claimed in claim 1, wherein the pull cord receiving member is movable along a center line of the carriage movement means.

14. The pull assist mechanism as claimed in claim 1, wherein the driving member at one end of the pull assist mechanism has a gear box.

15. The pull assist mechanism as claimed in claim 14, wherein the gear box is outside the housing, the gear box being attachable to a drive means of the pull assist mechanism or to a drive means of a separable power tool.

16. The pull assist mechanism as claimed in claim 1, wherein a pull cord guide member is provided in alignment with the pull cord receiving member.

17. The pull assist mechanism as claimed in claim 1, wherein a cover extends from the housing enclosing the pull cord receiving member along its path of travel.

18. The pull assist mechanism as claimed in claim 1, wherein the carriage movement means is movably mountable around at least part of a circumference of the guide means.

19. The pull assist mechanism as claimed in claim 1, wherein the carriage movement means is in slidable engagement with a circumference of the guide means.

20. The pull assist mechanism as claimed in claim 1, wherein the carriage movement means is an endless belt or chain.

21. The pull assist mechanism as claimed in claim 5, wherein the drive means has a control means in operable engagement therewith.

22. The pull assist mechanism as claimed in claim 21, wherein the control means can activate to full speed, deactivate, vary the speed therebetween, and/or reverse the direction of the drive means.

23. The pull assist mechanism as claimed in claim 21, wherein the control means is in operable engagement with a cord tension sensing means.

24. The pull assist mechanism as claimed in claim 5, wherein the drive means of the pull assist mechanism has a slip clutch.

25. The pull assist mechanism as claimed in claim 1, wherein the pull assist mechanism has a stabilizing means attachable thereto.

26. The pull assist mechanism as claimed in claim 1, wherein where a target device has a cord pull length of less than a specified amount, an adaptor is attachable to the pull assist mechanism.

27. The pull assist mechanism as claimed in claim 26, wherein the pull assist mechanism is attachable to a body or handle of the target device.

28. The pull assist mechanism as claimed in claim 1, wherein the reciprocating cord carriage means is in operable engagement with a biasing means.

29. The pull assist mechanism as claimed in claim 1, wherein the pull assist mechanism has a shock absorbing means for absorbing a force of a pull.

* * * * *